Figure 1:
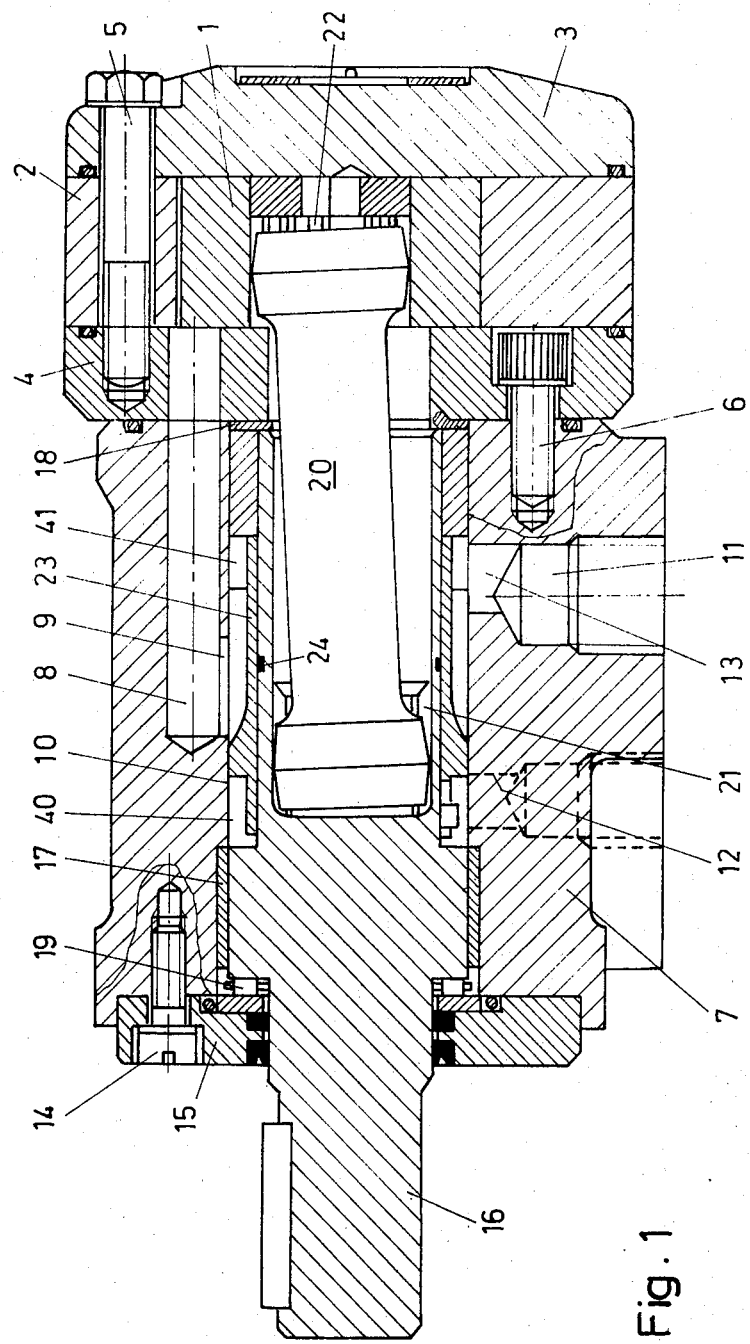

United States Patent [19]

Ohrberg et al.

[11] 3,771,905
[45] Nov. 13, 1973

[54] ROTARY-PISTON MACHINE

[75] Inventors: Carl Verner Ohrberg, Nordborg;
Carsten Georg Otto Petersen,
Waldenburg, both of Denmark

[73] Assignee: Danfoss A/S, Nordborg, Denmark

[22] Filed: Feb. 16, 1972

[21] Appl. No.: 226,658

[30] Foreign Application Priority Data
Feb. 17, 1971 Germany................... P 21 07 493.1

[52] U.S. Cl. ............................. 418/61, 137/625.21
[51] Int. Cl. ......... F01c 1/02, F03c 3/00, F04c 1/02
[58] Field of Search ...................... 418/61; 137/625.21–625.24

[56] References Cited
UNITED STATES PATENTS
| | | | |
|---|---|---|---|
| 3,452,543 | 7/1969 | Goff et al. | 418/61 |
| 3,597,128 | 8/1971 | Venable et al. | 418/61 |
| 3,552,892 | 1/1971 | Woodling | 418/61 |
| 3,547,563 | 12/1970 | Charlson | 418/61 |

*Primary Examiner*—Carlton R. Croyle
*Assistant Examiner*—John J. Vrablik
*Attorney*—Wayne B. Easton

[57] ABSTRACT

The invention relates to a rotary piston type machine in which an externally toothed wheel and an internally toothed ring form displacement chambers, and one of the toothed elements is connected by way of a universal joint shaft to a rotary slide which, together with a valve part connected to the other toothed element, forms a diversion valve. In such machines the connection between the one toothed element and the associated rotary slide, by way of the universal joint shaft, results in a certain amount of play. This causes leading and lagging between cooperating valve parts with the result that the machine suffers a loss in capacity because of imprecise control of the rotary slide. The lead and lag angles are even greater if the universal joint shaft is coupled to the main shaft and undergoes additional torsion with increasing input and output capacity of the machine. Means are provided to slightly rotate one of the valve elements relative to the main shaft in the reversed direction to compensate for the leading or lagging tendencies referred to.

3 Claims, 4 Drawing Figures

ROTARY-PISTON MACHINE

The present invention relates to a rotary-piston machine, in which an externally toothed wheel and an internally toothed ring between them form displacement chambers, and one of the toothed elements is connected by way of a universal joint shaft to a rotary slide which, together with a valve part connected to the other toothed element, forms a diversion valve.

In such machines the connection between the one toothed element and the associated rotary slide by way of the universal joint shaft results in a certain amount of play. If, in the case of a pump, the rotary slide is connected to the main shaft, the slide leads the toothed element in the rotary direction. If on the other hand the toothed element drives the rotary slide as is the case in a motor, the rotary slide lags behind the toothed element in the rotary direction. This leading and lagging are reversed when the direction of rotation changes. The result is that the machine suffers a loss in capacity because of imprecise control of the rotary slide. The lead and lag angles become still greater if the universal joint shaft is coupled to the main shaft and undergoes additional torsion with increasing input and output capacity of the machine.

The object of the invention is to provide a rotary piston machine of the initially stated kind in which the lead and/or lag of the rotary slide can be wholly or partially compensated.

According to the invention, this object is achieved by the rotary slide being rotatable by a limited amount relatively to the universal-joint shaft, and by the relative rotation being achieved by means of a device controlled by hydraulic pressure.

If the rotary slide is rotatable relatively to the universal-joint shaft, the lead or lag caused by the play or the load can be offset. By utilizing the hydraulic pressure for control purposes, the rotary direction of the machine and/or its load can be taken into account when effecting compensation.

In the simplest case, the rotating device turns the rotary disc in one or other direction depending upon the direction in which the pressure drops in the machine. In this way, anticlockwise running or clockwise running of the machine can be taken into account both in the case of a pump and a motor.

Moreover, the universal-joint shaft can be connected to the main shaft so that it rotates therewith, and the rotary slide can be mounted to rotate on the main shaft, the degree of rotation being greater than is necessary for compensation of play. In this way, the additional torsion in the universal-joint shaft caused by the load is taken into account.

In most cases it is not necssary to effect rotation in dependence upon the magnitude of the hydraulic control pressure, which could occur for example with a spring which counteracts the pressure; instead, for each direction of rotation, it suffices to effect a predetermined rotation suited to a mean value of the load expected, e.g. over a fixed angle of ±1.5°.

In a preferred embodiment the rotary slide is a sleeve, the two end-faces of which are acted upon by the input and output pressures respectively, and which is subjected to rotation through circumferential displacement by means of an inclined guide. The circumferentially directed pressure is converted into circumferential rotation as a result of the use of the inclined guide. Since a reversal in the rotary direction is also associated with a reversal of the input and output pressure, this arrangement automatically takes into account the clockwise or anticlockwise movement.

In particular, the sleeve may be axially displaceable betweeen two end-face stops. These stops define a fixed angle of rotation which is specific to the machine.

A further simplification is achieved by the sleeve consisting of three axially juxtaposed portions, the middle of which projects radially beyond the two others and has on its peripheral surface grooves which are closed at one end and lead alternately towards the two sides. In this case the middle portion acts as the positive rotary slide, whereas the two other portions replace the hitherto necessary circumferential supply and discharge grooves.

In another embodiment the rotary slide is rotatably mounted on a shaft which is connected to the universal-joint shaft so as to rotate therewith and which has in its periphery at least two wedge-shaped or conical recesses offset from each other, and the rotary slide has at least two plungers which have wedge-shaped or conical ends and which are inwardly displaceable in the radial direction by differing hydraulic pressures, the ends of the plungers having an angular spacing other than that of the recesses. In this arrangement, because of the wedge or conical form, radial movement of the pistons leads to rotation of the rotary slide in dependence upon which of the pistons is subjected to hydraulic pressure.

It is of advantage if two pairs of diametrically opposite recesses and pistons are provided. In this way, symmetrical loading is achieved.

Furthermore, the plungers may be offset from each other by the distance between the supply and discharge passages of the rotary slide, or by an odd-number multiple of this distance. The spaces accommodating the plungers can then be directly connected to the supply and discharge passages by very short branch passages.

The rotary slide is preferably a flat slide which contains continuous grooves for accommodating plungers of rectangular cross-section. These plungers as well as the grooves can then be very easily made.

Figure 2:
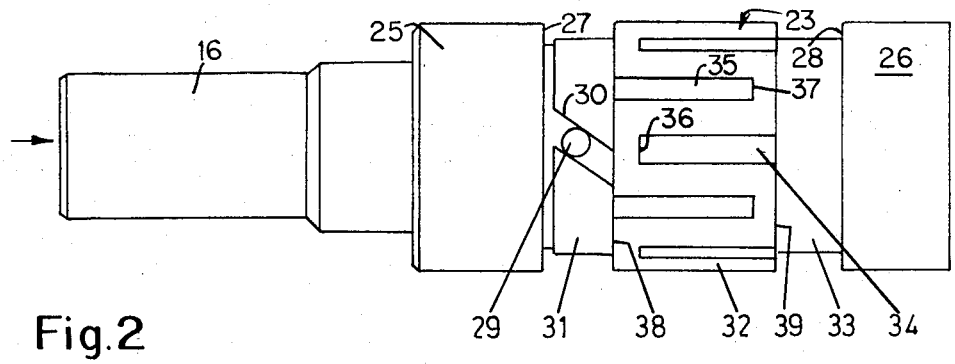
Figure 4:
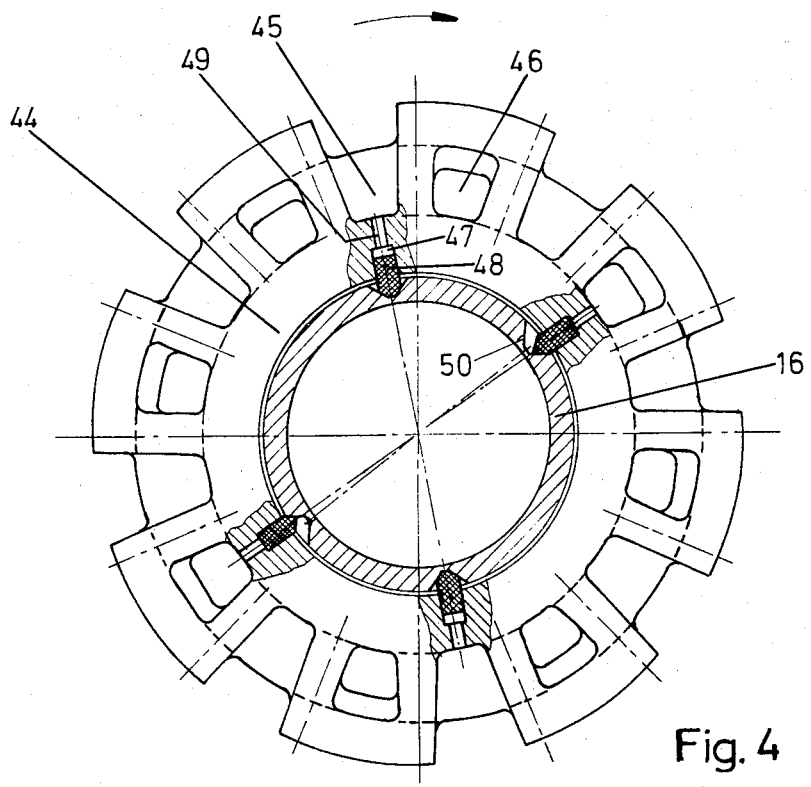
Figure 3:
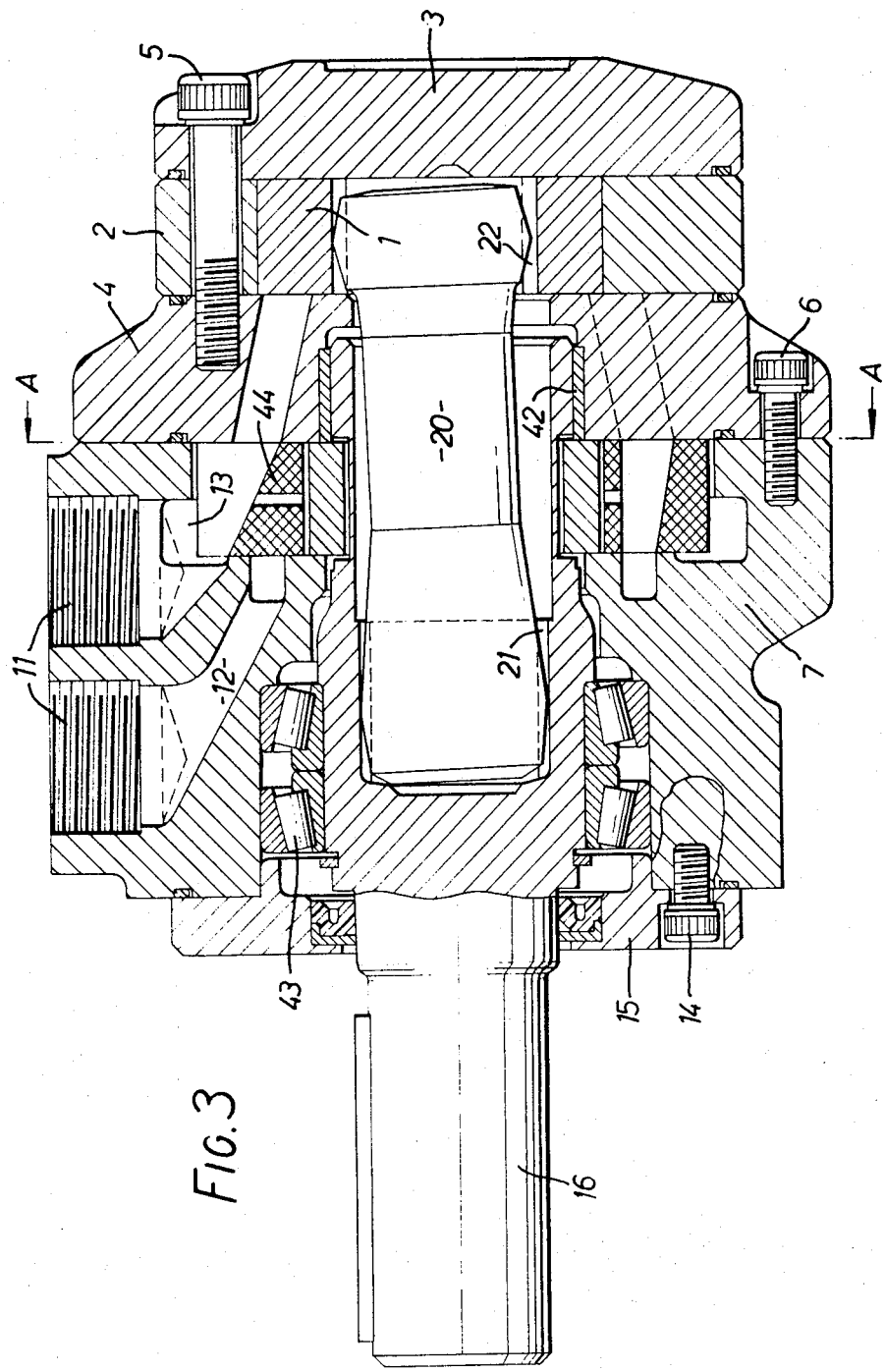

The invention will now be described in greater detail by reference to two embodiments. In the attached drawing:

FIG. 1 is a longitudinal section through a first embodiment of the rotary-piston machine of the invention, FIG. 2 is a plan view of the main shaft and the rotary slide of the machine of FIG. 1, FIG. 3 is a longitudinal section through another embodiment of the rotary-piston machine of the invention, and FIG. 4 is a side view, partly in section, of the rotary slide on the line A—A of FIG. 3.

Referring to FIGS. 1 and 2, the machine comprises a toothed wheel 1 and a toothed ring 2 co-operating with the wheel. These parts are enclosed on one side by a cover plate 3 and on the other by an intermediate plate 4. The cover plate 3, the toothed ring 2 and the intermediate plate 4 are interconnected by means of screws 5. The cover plate 4 and therefore the assembly just described are secured to a casing 7 by means of screws 6. The casing contains connecting passages 8, which each connect an opening 9 in the inner periphery 10 of the casing to holes in the intermediate plate 4, which holes lead to the displacement chambers between the toothed elements 1 and 2; the inner periphery 10 of the casing forms part of a diversion valve. Also provided in the casing are ports 11 which, by way of passages 12 or 13, likewise lead to the inner peripheral wall 10 but are axially offset from each opening 9. A closure plate 15 is fitted by means of screws 14 on the free end of the casing.

A main shaft 16 is mounted within a sleeve bearing 17 and between a bearing disc 18 and an axial bearing 19 held by the plate 15. A universal-joint shaft 20 engages by one of its ends in a toothed portion 21 on the main shaft 16 and by its other end in a toothed portion 22 in the toothed wheel 1.

A rotary slide 23 is rotatably mounted on the main shaft 16, an O-ring 24 being used for sealing purposes. The main shaft 16 and the rotary slide 23 are shown in greater detail from below in FIG. 2. The shaft has a flange 25 and a fitted ring 26, so that two stops 27 and 28 are formed between which the rotary slide 23 can be pushed backwards and forwards in the axial direction. A pin 29 extends through an inclined slot 30 in the rotary sleeve, so that axial displacement of the slide causes the latter to rotate. The slide consists of three portions 31, 32 and 33, the middle (32) of which has a greater diameter than the portions 31 and 33 and also contains grooves 34 and 35 which lead alternately to one of the portions 31 and 33 and are each closed at the other end 36 and 37. At the points where the middle portion 32 joins the outer portions 31 and 33 there are formed end-faces 38 and 39 respectively. When the system is operating, the spaces above the portions 31 and 33 constitute annular grooves 40 and 41 respectively which communicate with the connecting passages 12 and 13 respectively.

If the machine operates as a motor and pressure is supplied through the connecting passage 12, this pressure acts on the end face 38 and on the ends 37 of the grooves 35, so that the rotary slide 23 is displaced to the right. As this happens, the slide rotates, because of the inclined slots 30, in a manner which compensates play and torsion when the motor is running in the anticlockwise direction. When the direction of rotation is changed, the pressure is supplied through the connecting passage 13. It then acts on the end face 39 and the ends 36 of the grooves 34. The rotary slide 23 is displaced to the left. It then rotates into a position in which the play and loading torsion are compensated during clockwise rotation. Similar conditions apply if the machine is used as a pump.

At the same time the rotary slide fulfills its normal function since the chambers, formed between the toothed wheel 1 and the toothed ring 2, which has one more tooth than the wheel, are filled with and emptied of pressurized fluid in the correct sequence, by way of the grooves 34 and 35. The rotary slide 23 thus cooperates in the normal way with the inner periphery 10 of the casing as a diversion valve.

In the case of the embodiment illustrated in FIGS. 3 and 4, the same reference numerals are used as in the embodiment of FIGS. 1 and 2 for parts equivalent to those of this first embodiment.

The main shaft 16 is held at one end in a sleeve bearing 42 and at the other in a double roller bearing 43, the latter bearing also serving to fix the main shaft 16 in the axial direction.

The rotary slide 44 takes a form of a flat slide. It contains passages 45 and 46 which on one side are able to communicate with holes in the plate 4 and on the other side alternately communicate with annular chambers associated with the connecting passages 12 and 13.

At each of the four points on the inside periphery of the flat slide 44 is an axial groove 47 with a plunger 48 which tapers to the shape of a wedge at the bottom. The grooves are located opposite each other in pairs, and the pitch of the grooves is three or five times that of adjacent passgages 45 and 46. Each groove communicates with the passage located above it by way of a branch passage 49. The main shaft 16 contains wedge-shaped recesses 50, and the circumferential distance between these recesses is somewhat different from that of the plungers 48.

If the machine is operated as a motor and pressurized fluid is supplied through the connecting passage 13, i.e., is conveyed through the passages 45 in the rotary slide, then pressure is applied to the associated plungers 48 which are urged inwards. The rotary slide, which is rotatably mounted on the main shaft 16, then occupies the position illustrated in FIG. 4. When a change in the direction of rotation occurs during which pressurized fluid is supplied through the connecting passage 12, i.e., is conveyed through the passages 46 in the rotary slide, pressure is applied to the other pair of plungers which are urged inwards in the radial direction. Since, in the meantime, the first-mentioned plungers have been connected to the return pipe, the rotary slide is turned in the anticlockwise direction in FIG. 4. This results in the required compensation in dependence upon the direction of rotation.

Nor is there any difficulty in rendering rotation of the rotary slide relatively to the associated toothed wheel dependent upon load. For example the sleeve 23 of the rotary slide, instead of being urged towards the stops 27 and 28, can be pressed against cup springs which, depending upon the pressure, cause a varying degree of axial displacement and thus rotation. The steps illustrated are also suitable for those machines in which the toothed wheel is connected to the main shaft by way of a first universal-joint shaft, and to the rotary slide by way of a second universal-joint shaft, since in this arrangement at least the unavoidable play can be compensated. The arrangement is also suitable for those machines in which the toothed ring is connected to the rotary slide and the toothed wheel is stationary.

We claim:

1. A rotary piston machine comprising a housing, relatively rotatable toothed members for forming expansible and contractible chambers with at least one of said members being a movable toothed member which is movable relative to said housing, rotatable valve means, stationary valve means cooperable with said rotatable valve means, shaft means connecting said movable toothed member and said rotatable valve means, there being unavoidable circumferential play between said movable toothed member and said rotatable valve means, hydraulically operated means for adjustingly moving said rotatable valve means relative to said movable toothed member to compensatingly provide synchronous alignment and registration of the respective valve porting means between said movable and stationary valve means, said rotatable valve means having the form of a sleeve with end faces exposed to and acted upon by both inlet and outlet fluids respectively, said rotatable valve means having inclined slot means in fluid communication with said inlet fluid, and pin means cooperable with said slot means and being carried by said main shaft to cause said moving of said rotatable valve means relative to said movable toothed member.

2. A rotary piston machine according to claim 1 wherein said main shaft includes axially spaced stop faces, said rotatable valve means being axially displaceable between said stop faces.

3. A rotary piston machine according to claim 1 wherein said sleeve consists of three axially arranged portions with the end portions thereof being radially recessed relative to the center portion thereof, said center portion having two sets of circumferentially and alternately arranged axially extending grooves with said sets having respective fluid communication with said recessed end portions.

\* \* \* \* \*